INVENTOR.
WALTER J. ANTOSZEWSKI

Jan. 15, 1963  W. J. ANTOSZEWSKI  3,073,034
BOTTLE GAUGING APPARATUS
Filed Aug. 22, 1960                                  2 Sheets-Sheet 2

INVENTOR.
WALTER J. ANTOSZEWSKI
BY
ATTORNEYS

3,073,034
BOTTLE GAUGING APPARATUS
Walter J. Antoszewski, Toledo, Ohio, assignor to Owens-Illinois Glass Company, a corporation of Ohio
Filed Aug. 22, 1960, Ser. No. 51,054
20 Claims. (Cl. 33—174)

This invention relates to the inspection of containers and particularly to the inspection of hollow containers such as glass bottles and jars to determine whether the finish thereof is within proper specifications.

In the commercial use of hollow containers, such as glass bottles and jars, in high-speed handling and filling apparatus, it is essential that certain dimensions and tolerances be maintained in the manufacture of such containers and particularly in the upper surface of the container, commonly known as the finish. The critical tolerances include variation in height of the surface of the finish around the periphery thereof commonly known as warp and dip; the level of the finish, commonly known as cocked finish; and height.

In the copending application Serial No. 42,837, filed July 14, 1960, titled Bottle Gauging by Richard L. Early and Thomas B. Sorbie and assigned to the assignee of the present application, there is disclosed and claimed a method and apparatus for simultaneously gauging the finish of a container to check for excessive warp, dip, cocked finish and height. Basically, the invention disclosed and claimed in that application comprises scanning the finish of the container, creating a voltage signal in response to the variation in height of the finish of the container, and analyzing and comparing said variation in voltage to determine whether it exceeds predetermined limits which would require rejection of the container. In the aforementioned application, the container is brought into position adjacent a head which has a plurality of contact members in the form of rollers thereon that scan the finish of the container. One of the rollers is connected to the core of a differential transformer and the movement of the roller and, in turn, the core creates the alternating current voltage signal as output of the differential transformer.

It is an object of this invention to provide a novel head construction for supporting the roller members.

It is a further object of the invention to provide an apparatus wherein the contact members are immobilized at the times when a container is not being inspected.

It is a further object of the invention to provide such an apparatus where the contact members are movable into and out of inspecting position.

Figures 1, 2:
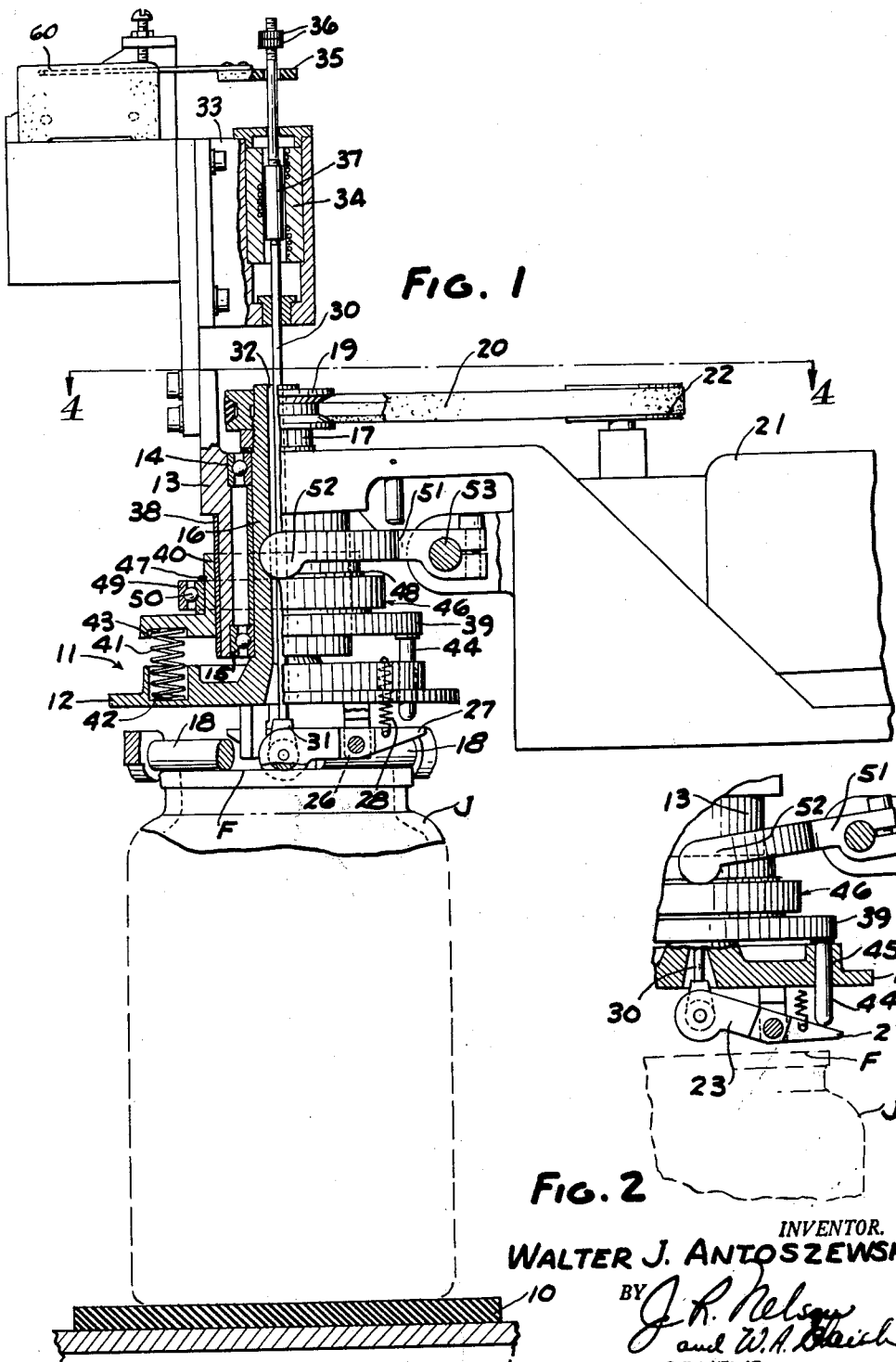
FIG. 1 is a part sectional elevation of an apparatus embodying the invention.
FIG. 2 is a fragmentary part sectional view of a portion of the apparatus shown in FIG. 1, showing the inspecting contact member in inoperative position.

Referring to FIG. 1, the gauging apparatus is intended to inspect hollow containers such as glass jars J of the type having an open upper end defining what is commonly termed a finish F. The jars J are brought into gauging position by a bottle transfer mechanism of conventional type such as shown and described in the patent to Fedorchak et al. 2,682,802.

The gauging apparatus comprises a support 10 to which the jar J is brought into engaging position by the transfer mechanism. As inspecting head 11 is mounted in position above the support 10 and comprises a hub 12 that is rotatably mounted in a fixed cylindrical projection 13 by spaced roller bearings 14, 15 which surround the shaft 16 of hub 12 that extends upwardly into an opening in the projection 13. A lock nut 17 threaded on the upper end of shaft 16 engages the inner core of bearing 14 and thereby supports the shaft 16 and hub 12 in position in the projection 13. The hub 12 supports a plurality of rollers 18 as presently described which are adapted to contact the finish F of the jar J. Head 12 is rotated about its axis by an arrangement which includes a pulley 19 fixed to the upper end of the shaft 16, a belt 20 trained over pulley 19, and a motor 21 which drives a second pulley 22 over which the belt 20 is trained.

Figure 3:
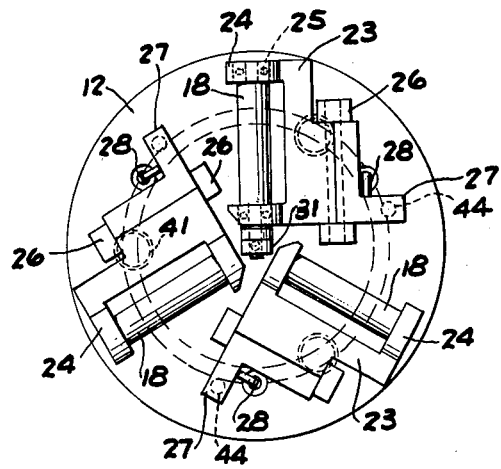
FIG. 3 is a bottom plan view of a portion of the apparatus shown in FIG. 2.
Figure 4:
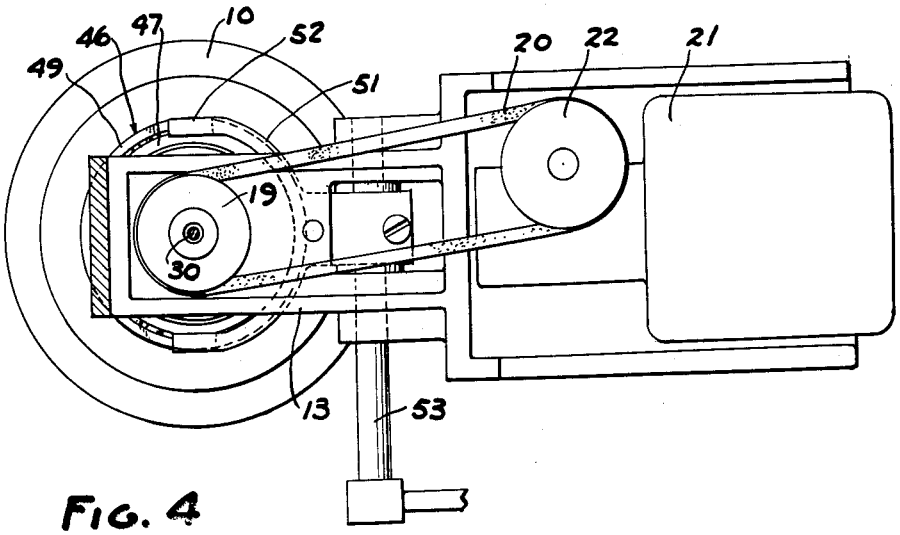
FIG. 4 is a sectional view taken along the line 4—4 in FIG. 1.

Referring to FIGS. 1, 2 and 3, rollers 18 are supported on the underside of hub 12 for rotation about radial horizontal axes parallel to the upper surface of support pad 10 and for vertical movement. Each roller 18 is rotatably mounted in a carrier 23 which includes a pair of spaced arms 24 supporting bearings 25 into which reduced ends of roller 18 extend. Each carrier 23 is mounted for limited vertical pivoting movement relative to the hub 12 between posts 26 extending downwardly from the underside of the hub 12. Each carrier 23 also includes a portion 27 that extends on the other side of the posts 26. A tension spring 28 is fastened at one end to portion 27 of each carrier 23 and at its other end to the hub 12 thereby yieldingly urging roller 18 downwardly.

One of the rollers 18 is connected to a spindle 30 of plastic or other non-magnetic material by a swivel member 31. Spindle 30 extends upwardly through an axial opening 32 in shaft 16 and through a bracket 33 that supports a differential transformer 34. The upper end of spindle 30 extends through an opening in an arm 35 and a pair of lock nuts 36 is threaded thereon to limit the downward movement of the spindle 30. The core 37 of the differential transformer is fixed to the spindle 30. On gauging, lock nuts 36 engage and actuate the arm 35 of microswitch 60 to keep the electronic circuits deenergized.

Differential transformer 33 in its operation is of conventional construction and is more fully described in the aforementioned application. Such differential transformers conventionally comprise a primary and a pair of secondary windings connected in series. There is a neutral position of the core 37 so that when the core 37 is moved up and down a positive or negative signal is created with respect to the neutral position. In the above arrangement, the position of the core 37 corresponds to the height of the finish of the jar J at any predetermined point and therefore the height of the container at any predetermined point is indicated by the output of the transformer. If the container J has an excessive warp finish, then the core 37 will move more than a predetermined amount. If the container has an excessive dip, then the core 37 will move more than a predetermined amount in a predetermined degree of peripheral movement of the roller less than the peripheral distance in measuring for warp finish. If the container J has a cocked surface, then the core 37 will have an excessive movement between its uppermost position and its lowermost position in a predetermined degree of peripheral movement of the roller. If the height of the container is beyond predetermined limits, then the core 37 will move upwardly or downwardly beyond a predetermined amount. These movements are transferred into a voltage signal in the differential transformed by an electronic mechanism, such as shown in the copending application, to check and reject the container in the event that the container is not within predetermined limits.

According to the present invention, novel means are used for bringing the rollers 18 into and out of operative or inspecting position. As shown in FIG. 1, a sleeve 38 is mounted on the outer surface of the lower end of projection 13 and an axially slidable plate 39 having a hub 40 is positioned over the sleeve 38. Plate 39 is yieldingly urged upwardly by a plurality of circumferentially spaced compression springs 41, each spring being positioned in opening 42 in the upper surface of hub 12 and extending into an opening 43 in the lower surface of plate 39. A plurality of pins 44 equal in number to the number of roller carriers 23 are fixed to the plate 39 and extend downwardly through openings 45 in the hub 12 into position overlying the extension portions 27 of the roller carriers 23. By this arrangement, the plate 39 is adapted to actuate the roller carriers 23 and move them into and out of operative position. Specifically, when the actuating plate 39 is moved downwardly, pins 44 engage portions 27 of the roller carriers 23 swinging rollers 18 upwardly into inoperative position as shown in FIG. 2. When the plate 39 is moved upwardly, the pins 44 are moved out of engagement with the portions 27 of roller carrier 23 permitting the rollers 18 to assume the inspecting position shown in FIG. 1.

The apparatus for moving the plate 39 downwardly comprises a ball bearing 46 mounted on the hub 40 of plate 39 and comprising an inner race 47 that engages the upper surface of the plate 39 and is locked in position by a lock washer 48, an outer race 49 and a plurality of balls 50. An actuating yoke 51 comprising spaced arms 52 is fixed on a horizontal shaft 53 that is periodically oscillated in timed relation to the inspecting mechanism. Oscillation of the yoke 51 brings the arms 52 into engagement with the outer race 49 of ball bearing 46 forcing the plate 39 downwardly. When the yoke 51 is swung upwardly, springs 41 force the plate 39 and, in turn the bearing 46 upwardly. By this arrangement, the head 12 and, in turn, the plate 39 can be rotated without interfering with the vertical movement of the plate 39.

In operation, a jar J is brought into inspecting position on support 10 and the yoke 51 is swung upwardly permitting the springs 41 to move the plate 39 upwardly and disengaging the pins 44 from contact with the carriers 23. In this position, the rollers 18 are thereby brought into contact with the finish F of the container. As the head 12 is rotated, the rollers contact and scan the finish F and the core 37 of the differential transformer is moved upwardly and downwardly in response to variations in the height of the finish creating a varying voltage signal. The signal is compared by the electronic apparatus and utilized to actuate a reject mechanism if the container has an excessive warp finish, dip finish, cocked finish or exceeds a maximum or minimum height. When the inspection is completed yoke 51 is swung downwardly, moving the plate 39 downwardly and thereby causing pins 44 to engage carriers 23 and swing the rollers 18 upwardly. This moves the rollers 18 out of engagement with the finish F of the container J, permitting the container J to be removed from support 10 without interference.

I claim:

1. In a container gauging apparatus, the combination comprising a support on which a container is adapted to be positioned for inspection, a head positioned above said support, means for rotatably mounting said head, a contact member movably mounted on said head and adapted to engage the finish of a container positioned on said support, an actuating element axially mounted on said head and adapted to rotate with said head, means for moving said actuating element into and out of position engaging said contact member, a differential transformer including a core, and means for operatively connecting said core to said contact member.

2. The combination set forth in claim 1 including bearing means interposed between said means for engaging said actuating element and said actuating element comprising at least two members, one of said members being fixed to said actuating element and the other said member being rotatably mounted relative to said actuating element, said latter member being engaged by said means for engaging said actuating element.

3. The combination set forth in claim 2 wherein said two members comprise the races of a bearing.

4. The combination set forth in claim 3 wherein said bearing is of the ball bearing type.

5. In a container gauging apparatus, the combination comprising a support on which a container is adapted to be positioned for inspection, a head, means for rotatably mounting said head about a vertical axis above said support, a contact member pivoted about a horizontal axis to said head and adapted to engage the finish of a container positioned on said support, a differential transformer including a core, and means for operatively connecting said core to said contact member, an actuating element mounted for rotation with said head and for axial movement relative to said head, said actuating element having a portion adapted to engage said contact member to move said contact member out of position for engaging the finish of a container, and means engaging said actuating element and actuating said element to move said contact member out of position.

6. The combination set forth in claim 5 wherein a bearing is provided between said latter means and said actuating element.

7. The combination set forth in claim 5 wherein a bearing is provided between said latter means and said actuating element and comprises a first member fixed to said actuating element, a second member, a roller between said second and first member, said engaging means contacting said latter member.

8. In a container gauging apparatus, the combination comprising a support on which a container is adapted to be positioned for inspection, a head positioned above said support, means for rotatably mounting said head, a contact member movably mounted on said head and adapted to engage the finish of a container positioned on said support, an actuating element axially mounted on said head and adapted to rotate with said head, and means for moving said actuating element into and out of position engaging said contact member for controlling the engagement of said contact member with said container.

9. The combination set forth in claim 8 including bearing means interposed between said means for engaging said actuating element and said actuating element comprising at least two members, one of said members being fixed to said actuating element and the other said member being rotatably mounted relative to said actuating element, said latter member being engaged by said means for engaging said actuating element.

10. The combination set forth in claim 8 wherein said two members comprise the races of a bearing.

11. The combination set forth in claim 10 wherein said bearing is of the ball bearing type.

12. In a container gauging apparatus, the combination comprising a support on which a container is adapted to be positioned for inspection, a head, means for rotatably mounting said head about a vertical axis above said support, a contact member pivoted about a horizontal axis to said head and adapted to engage the finish of a container positioned on said support, an actuating element mounted for rotation with said head and for axial movement relative to said head, said actuating element having a portion adapted to engage said contact member to move said contact member out of position for engaging the finish of a container, and means engaging said actuating element and actuating said element to move said contact member out of position.

13. The combination set forth in claim 12 wherein a bearing is provided between said latter means and said actuating element.

14. The combination set forth in claim 12 wherein a bearing is provided between said latter means and said actuating element and comprises a first member fixed to said actuating element, a second member, a roller between said second and first member, said engaging means contacting said latter member.

15. In a container gauging apparatus, the combination comprising a support on which a container is adapted to be positioned for inspection, a head, means for rotatably mounting said head about a vertical axis above said support, a contact member pivoted about a horizontal axis to said head and adapted to engage the finish of a container positioned on said support, an actuating element mounted for rotation with said head and for axial movement relative to said head, said actuating element having a portion adapted to engage said contact member to move said contact member out of position for engaging the finish of a container, vertically movable actuating means for moving said actuating element, and bearing means interposed between said actuating means and said actuating element for permitting relative rotation between said actuating element and said actuating means while said actuating element and actuating means are moving vertically.

16. In a container gauging apparatus, the combination comprising a support on which a container is adapted to be positioned for inspection, a head, a projection mounted in fixed position above said support, means for rotatably mounting said head about a vertical axis on said projection and above said support, said projection having a cylindrical external surface, a plate having a hub engaging said surface on said projection, said plate being movable vertically and rotatable relative to said projection, means extending between said head and said plate and yieldingly urging said palte upwardly, at least one carrier mounted on the underside of said head, a roller rotatably mounted in said carrier for rotation about a horizontal axis, said carrier being swingable about a horizontal axis, said plate having means extending downwardly through said plate into engagement with a portion of said carrier for swinging said carrier out of bottle gauging position, means for yieldingly urging said carrier into bottle engaging position, and means for actuating said plate and moving it downwardly to swing said carrier and, in turn, said roller out of bottle engaging position.

17. In a container gauging apparatus, the combination comprising a support on which a container is adapted to be positioned for inspection, a head, a projection mounted in fixed position above said support, means for rotatably mounting said head about a vertical axis on said projection and above said support, said projection having a cylindrical external surface, a plate having a hub engaging said surface on said projection, said plate being movable vertically and rotatable relative to said projection, means extending between said head and said plate and yieldingly urging said plate upwardly, at least one carrier mounted on the underside of said head, a roller rotatably mounted in said carrier for rotation about a horizontal axis, said carrier being swingable about a horizontal axis, said plate having means extending downwardly through said plate into engagement wtih the portion of said carrier for swinging said carrier out of bottle gauging position, means for yieldingly urging said carrier into bottle engaging position, means for actuating said plate and moving it downwardly to swing said carrier and, in turn, said roller out of bottle engaging position, a differential transformer mounted in fixed position above said projection and having a movable core, and means interconnecting said roller and said movable core.

18. In a container gauging apparatus, the combination comprising a support on which a container is adapted to be positioned for inspection, a head positioned above said support, means for rotatably mounting said head, a plurality of circumferentially spaced contact members movably mounted on said head and adapted to engage the finish of a container positioned on said support, actuating means mounted for rotation with said head and for axial movement relative to said head, rotatably fixed means for moving said actuating means into and out of position engaging said contact members, a sensing device having a movable member, and means for operatively connecting said movable member to one of said contact members.

19. In a container gauging apparatus, the combination comprising a suport on which a container is adapted to be positioned for inspection, a head, means for rotatably mounting said head about a vertical axis above said support, a plurality of circumferentially spaced contact members pivoted about a horizontal axis to said head and adapted to engage the finish of a container positioned on said support, a sensing device having a movable member, and means for operatively connecting said movable member to one of said contact members, an actuating element mounted for rotation with said head and for axial movement relative to said head, said actuating element having a portion adapted to engage said contact members to move said contact members out of position for engaging the finish of a container, and means engaging said actuating element and actuating said element to move said contact members out of position.

20. In a container gauging apparatus, the combination comprising a support on which a container is adapted to be positioned for inspection, a head, a projection mounted in fixed position above said support, means for rotatably mounting said head about a vetrical axis on said projection and above said support, said projection having cylindrical external surface, a plate having a hub engaging said surface on said projection, said plate being movable vertically and rotatable relative to said projection, means extending between said head and said plate and yieldingly urging said plate upwardly, a plurality of carriers mounted on the underside of said head, a roller rotatably mounted in each said carrier for rotation about a horizontal axis, said carriers being swingable about a horizontal axis, said plate having means extending downwardly through said plate into engagement with the portion of said carriers for swinging said carriers out of bottle gauging position, means for yieldingly urging said carriers into bottle engaging position, means for actuating said plate and moving it downwardly to swing said carriers and, in turn, said roller out of bottle engaging position, a sensing device having a movable member, and means interconnecting said movable member and one of said carriers.

References Cited in the file of this patent
UNITED STATES PATENTS

| | | |
|---|---|---|
| 2,452,862 | Neff | Nov. 2, 1948 |
| 2,860,419 | Muller | Nov. 18, 1958 |